(12) United States Patent
Greenlee et al.

(10) Patent No.: US 7,693,991 B2
(45) Date of Patent: Apr. 6, 2010

(54) VIRTUAL CLUSTERING AND LOAD BALANCING SERVERS

(75) Inventors: Gordan G. Greenlee, Endicott, NY (US); Dennis Hartel, Berthoud, CO (US); Joseph F. Riina, Wayne, NJ (US); Richard E. Weingarten, Erie, CO (US)

(73) Assignee: International Business Machines Corporation, Armonk, NY (US)

( * ) Notice: Subject to any disclaimer, the term of this patent is extended or adjusted under 35 U.S.C. 154(b) by 1381 days.

(21) Appl. No.: 10/758,538

(22) Filed: Jan. 16, 2004

(65) Prior Publication Data

US 2005/0160133 A1    Jul. 21, 2005

(51) Int. Cl.
G06F 15/173    (2006.01)
(52) U.S. Cl. .................. 709/226; 709/223; 709/224; 709/246
(58) Field of Classification Search .............. 709/223, 709/200, 224, 246
See application file for complete search history.

(56) References Cited

U.S. PATENT DOCUMENTS

| | | | |
|---|---|---|---|
| 5,459,837 A | 10/1995 | Caccavale | |
| 5,898,870 A | 4/1999 | Okuda et al. | |
| 5,915,095 A | 6/1999 | Miskowiec | |
| 5,918,017 A | 6/1999 | Attanasio et al. | |
| 6,067,545 A | 5/2000 | Wolff | |
| 6,092,178 A | 7/2000 | Jindal et al. | |
| 6,119,143 A | 9/2000 | Dias et al. | |
| 6,314,465 B1 | 11/2001 | Paul et al. | |
| 6,324,580 B1 | 11/2001 | Jindal et al. | |
| 6,327,622 B1 | 12/2001 | Jindal et al. | |
| 6,351,775 B1 | 2/2002 | Yu | |
| 6,446,218 B1 | 9/2002 | D'Souza | |
| 6,560,717 B1 | 5/2003 | Scott et al. | |
| 6,578,068 B1 | 6/2003 | Bowman-Amuah | |
| 7,213,065 B2 * | 5/2007 | Watt | 709/223 |
| 2002/0049859 A1 * | 4/2002 | Bruckert et al. | 709/246 |
| 2003/0037093 A1 | 2/2003 | Bhat et al. | |

OTHER PUBLICATIONS

G. Kar, et al., "Algorithm for Optimizing Performance of Distributed Systems by Load Balancing and Minimizing Communication Cost", IBM Technical Disclosure Bulletin, vol. 28, No. 11, Apr. 1986.
A. Bouloutas, et al., "MM Packing : Load and Storage Balancing Algorithm for Distributed Multi-media Servers", IBM Technical Disclosure Bulletin, vol. 39, No. 4, Apr. 1996.

* cited by examiner

*Primary Examiner*—Vivek Srivastava
*Assistant Examiner*—Adnan Mirza
(74) *Attorney, Agent, or Firm*—William Schiesser; Greenblum & Bernstein P.L.C.

(57) ABSTRACT

A method and system is provided intelligent network dispatchers that are capable of routing requests to one or more servers (e.g., LDAP servers) based on the requested application or the identity of the requester. The servers may be grouped into virtual clusters so that a particular cluster may service requests associated with a particular application or based on a type of customer (e.g., preferred or general customer) in order to grade levels of service. Also, a system resource monitor may provide continual monitoring of servers in virtual clusters to determine when one or more servers are overburdened or under burdened based on statistical performance data. As a servers performance changes, the system resource monitor may advise the intelligent network dispatcher causing a change in the rate of requests to the overburdened/under burdened server. The server may be temporarily removed from the virtual cluster until performance levels normalize. Further, servers may be re-assigned to other virtual clusters on demand to provide increased capacity to a virtual cluster.

39 Claims, 8 Drawing Sheets

VIRTUAL CLUSTERING AND LOAD BALANCING SERVERS

BACKGROUND OF THE INVENTION

1. Field of the Invention

The invention generally relates a system and method of monitoring servers in a network and, more particularly, intelligently routing requests from a network dispatcher to servers allocated in virtual clusters based on rules.

2. Background Description

In a network system, it is difficult to load balance millions of query activities over a number of servers in an open cluster environment when queries may vary from a very simple to resolve to being complex and rather timely to resolve, for example, queries to a lightweight directory access protocol (LDAP) server or to web application servers. In today's networking environments, intelligent network dispatching capability does not exist for handling these conditions on demand. The best approach that exists today is "round robin" dispatching that may lead to overload of an already burdened server while other servers remain practically idle.

Further, there is no capability to sense when a server, for example, an LDAP server or web application server, is heavily burdened either absolutely or in relation to other servers. This may lead to further overloading of the overburdened server, which creates inefficiencies within the system. Thus, temporary or even permanent reallocation of new queries to other servers in a cluster or shifting of server assignments is a desirable capability to improve overall query throughput and lessening of bottlenecks in network operations.

FIG. 1 is an exemplary block diagram of a typical network environment that includes LDAP servers 100, a network dispatcher 105, and one or more application requesters 110. In the environment of FIG. 1, requests from application requesters 110 to the network dispatcher 105 are targeted for any of the LDAP servers 100. These requests typically may be routed in a "round-robin" fashion among the set of LDAP servers 100. That is, a preset pattern, in circular fashion, may typically be used to distribute requests from the network dispatcher 105 to the LDAP servers 100. No awareness of capacity, current status, or ability to handle the request by any of the LDAP servers 100 is known to the network dispatcher 105. If any one of the LDAP servers 100 is overloaded, under this arrangement, it may become more overloaded. Further, there is no authentication of the requester request for access to a server.

When an application (e.g. 110) requires a number of servers (e.g., LDAP servers 100) in order to handle peak load periods, there is a burden with an overhead of keeping the servers available for just those peak periods. This may be a waste of resources. Also, during those peak periods for certain exploiters, classes of requests (e.g., a preferred customer) may require preferred treatment and service so that they may be serviced more quickly.

SUMMARY OF THE INVENTION

In an aspect of the invention, a method is provided for processing queries in a network. The method comprises the steps of defining a plurality of virtual clusters from a plurality of servers and routing a request to a virtual cluster of the plurality of virtual clusters based on predetermined criteria.

In another aspect of the invention, a method for load balancing servers is provided. The steps include allocating a plurality of servers among a plurality of virtual clusters, monitoring the plurality of virtual clusters for workload capacity and reassigning at least one server from one of the plurality of virtual clusters to another of the plurality of virtual clusters based on workload capacity.

In another aspect of the invention, a computer program product comprising a computer usable medium having readable program code embodied in the medium is provided. The computer program product includes at least one component to define a plurality of virtual clusters from a plurality of servers and to route a request to a virtual cluster of the plurality of virtual clusters based on predetermined criteria.

DETAILED DESCRIPTION OF EMBODIMENTS OF THE INVENTION

This invention, in embodiments, is directed to a system and method for monitoring performance of servers in a network environment (e.g., lightweight directory access protocol (LDAP) servers or web application servers) and allocating service requests based on rules based routing. In the invention, the servers may also be organized into virtual clusters (VC) so that a controlled grade of service may be provided based on, for example, the identity of the requester or the application being requested. Authentication of the requester to the requested server application may also occur.

By monitoring individual servers, performance statistics (e.g., memory utilization, CPU utilization, response time, connection counts, and the like) may be established in order to trigger re-direction of requests to under-utilized servers. Also, redirection may occur, for example, to reduce load on an overloaded server, or re-allocate one or more servers from one virtual cluster to another virtual cluster to add/reallocate capacity as needed based on need, for example, to service a particular application or applications in a particular virtual cluster at peak demand periods. This increases the efficiency of the system.

Figure 1:
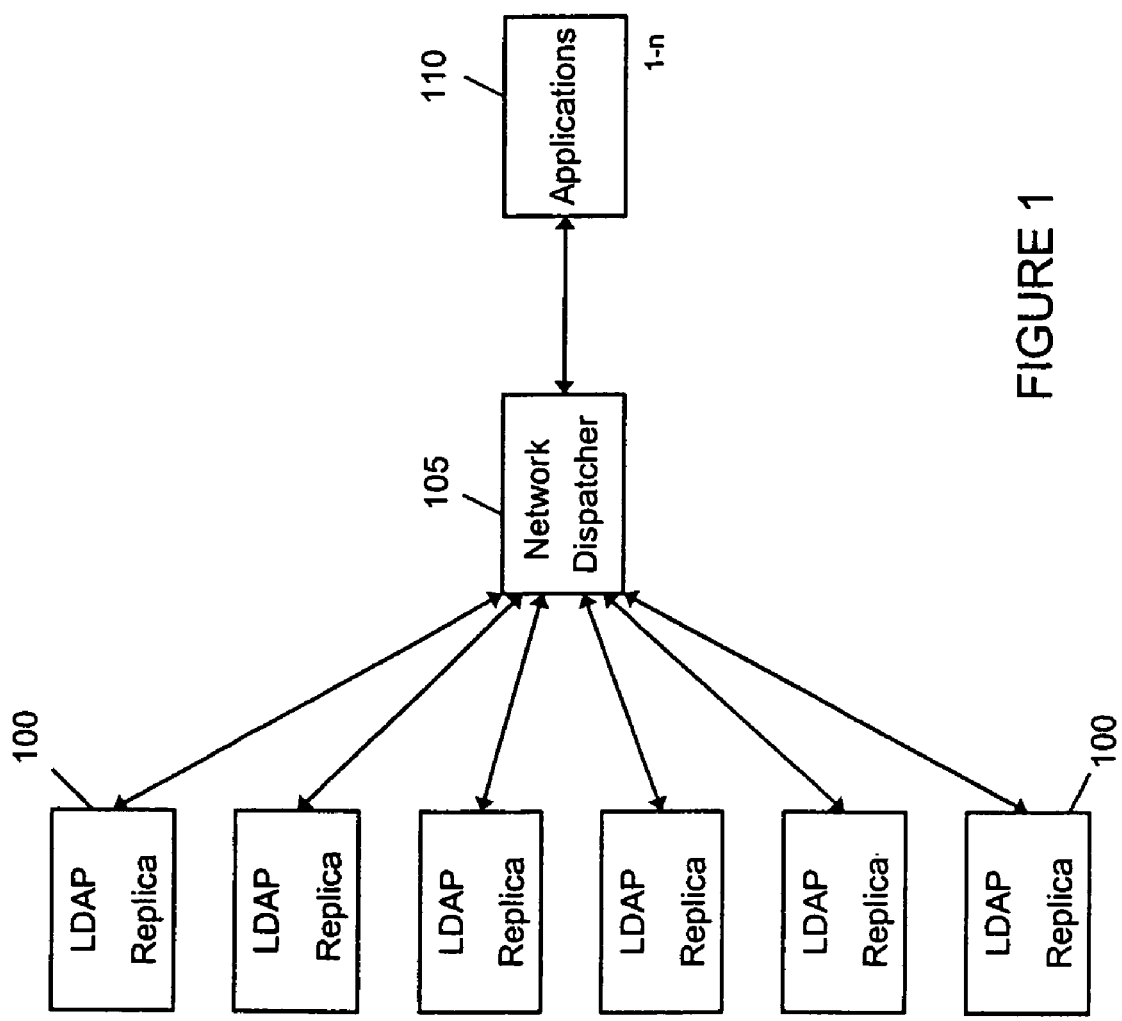
FIG. 1 is an exemplary block diagram of a typical network environment.
Figure 2:
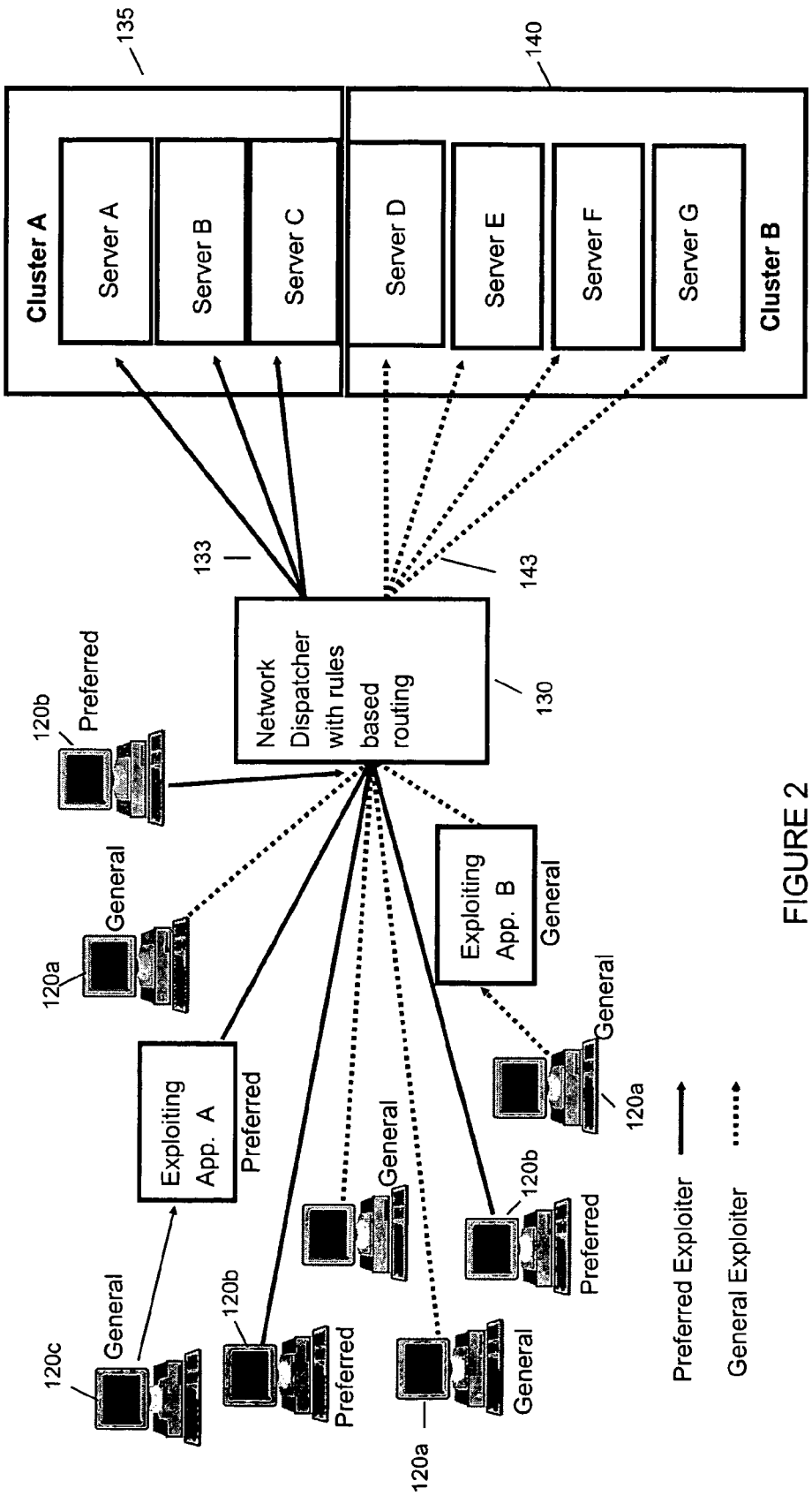
FIG. 2 is a block diagram of an embodiment of the invention.

FIG. 2 is a bock diagram of an embodiment of the invention. Applications 120a, 120b, and 120c (which may be client applications, system applications, or the like) are in communication, typically by way of a network, with an intelligent network dispatcher 130. The intelligent dispatcher 130 is designed to provide static rules based routing, or alternatively, intelligent routing of service requests from the applications 120a-120c. The rules are discussed below.

In embodiments, applications 120a are representative of a class of clients that requires a general grade of service when requesting service and applications 120b are representative of clients that require a preferred grade of service (better performance compared with the general class). Alternatively, the grade of service may be based on the server application (e.g., applications running on servers A-G) being accessed by the applications 120a-120c.

Servers A-G may be logically grouped by administration of the intelligent network dispatcher 130 into one or more virtual clusters such as 135 and 140. In the illustrative example of FIG. 2, servers A-C may be assigned to virtual cluster A, 135, and servers D-G assigned to another virtual cluster B, 140. Although two virtual clusters are shown in FIG. 2, it should be apparent to one of ordinary skill in the art that any number of virtual clusters may exist depending upon circumstances.

Any number of virtual cluster (e.g., 135 and 140) may be created, in accordance with the invention, with one or more servers grouped into the virtual cluster based upon some form of common functionality. For example, in an embodiment, virtual cluster "A", 135, may service requests for preferred customers, while virtual cluster "B", 140, services requests for general customers. The virtual cluster may also be created with servers having a common set (or subset) of server applications. Servers may also be assigned to more than one virtual cluster.

The intelligent network dispatcher 130 receives requests (e.g., LDAP lookup requests) from applications 120a-120c (associated with users or customers) and, based on rules configured within the intelligent network controller 130, intelligently routes the request from a requester to an appropriate server. These rules may be pre-programmed into the intelligent network dispatcher by one of ordinary skill in the art of such rules based programming.

For example, the virtual cluster A, 135, may service requests from a preferred exploiters or customers (known, for example, by their internet protocol (IP) addresses, internet address, or other network identifier). In this case, these requests may be authenticated and directed, as represented by reference numeral 133, by the intelligent network dispatcher 130 to one of the servers in virtual cluster A, 135, on a service priority basis. In contrast, non-preferred/general customers may be routed to virtual cluster B, 140, as indicated by reference numeral 143, on a less urgent basis.

The rules of intelligent dispatcher 130 may also stipulate that requests are routed based upon what server application is being requested. For example, server application type "A" may be serviced on cluster A while server application type "B" may be serviced on cluster B. In embodiments, a combination of these two scenarios may also exists, whereby a general customer (e.g., 120c) when requesting service for a particular server application (e.g., "A") may receive preferred routing by the intelligent network dispatcher 130 to virtual cluster A, 135, for that particular type of request. However, a request for server application of type "B" from the same general customer 120c may be routed to virtual cluster B, 140. In embodiments, a preferred customer 120b may be directed to virtual cluster A for either type of server application request, type "A" or "B" (with cluster A being capable of servicing either server application type "A" or "B" requests). In this manner, grades of service may be provided based on the requester's identity and the type of server application being requested.

Further, the rules based routing of the intelligent network dispatcher 140 may include time-of-day and day-of-week parameters. Time based rules provide for alteration of routing decisions that compensate for historically known or anticipated peaks and lulls in requests. For example, from midnight to 6:00 AM, or weekends all day, a lull in requests may permit any request to any server application to be routed to cluster A, 135, or cluster B, 140. However, rerouting may occur at 6:00 AM (or, alternatively, non-weekend), when segregation of routing may be re-instated depending on the rules appropriate for 6:00 AM (or, alternatively, non-weekend).

Figure 3:
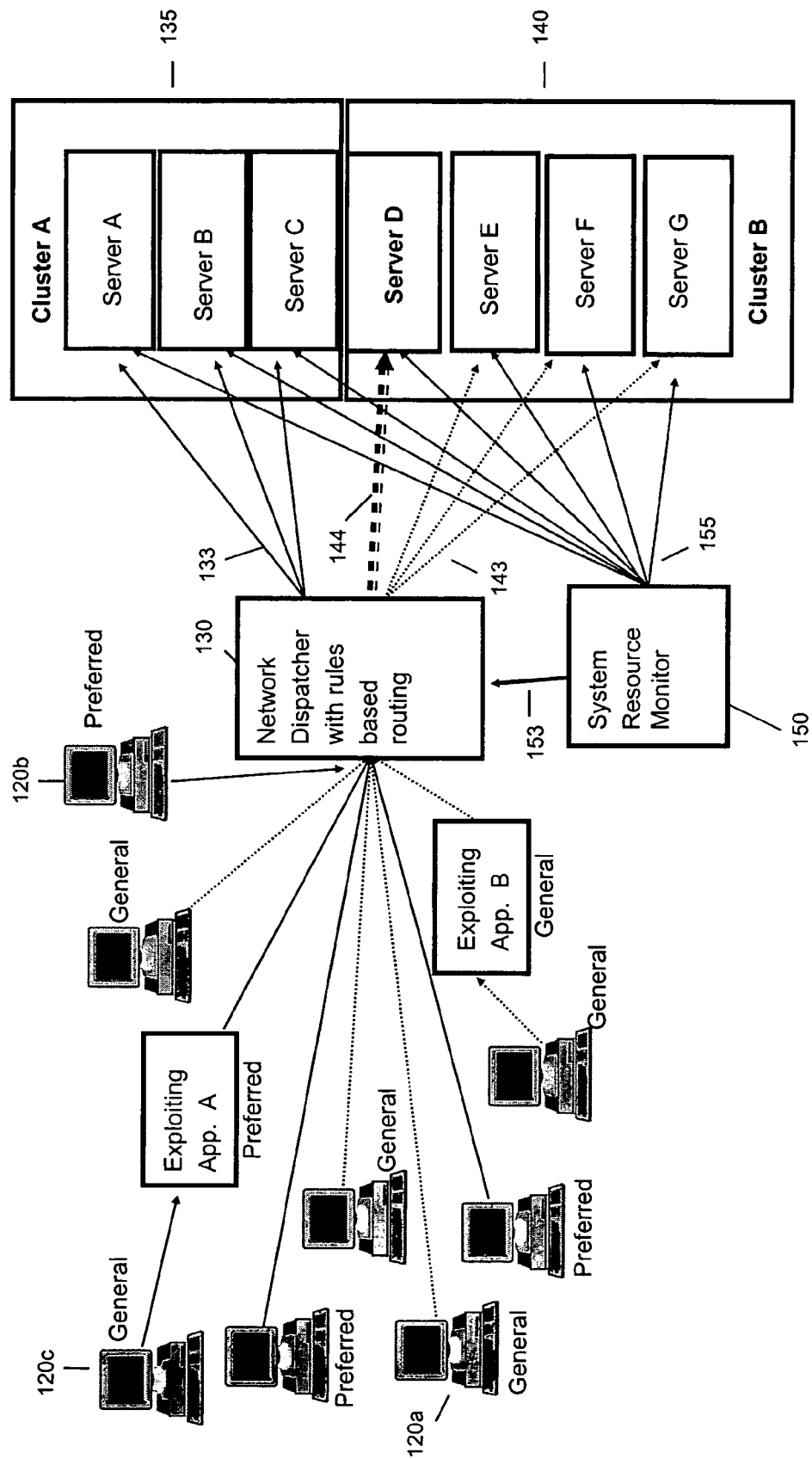
FIG. 3 is a block diagram of an embodiment of the invention.

FIG. 3 is a block diagram of an embodiment of the invention. FIG. 3 includes a system resource monitor 150 that is in communication with the intelligent network dispatcher 130, represented by communication path 153. The system resource monitor 150 is also in communication with each server within its domain of virtual clusters, in this example, cluster A, 135, and cluster B, 140. The allocation of servers A-G among virtual clusters may be commonly shared information between the system resource monitor 150 and intelligent network dispatcher 130. Communication paths 133, 144, 153 and 155 may be bi-directional.

The system resource monitor 150 monitors, represented by reference numeral 155, the overall performance statistics of each server A-G including such statistics as CPU utilization, memory utilization, overall connection counts, response time, and the like. The system resource monitor includes an advisor function that updates the intelligent network monitor 130 concerning the monitored conditions and status within each of the servers A-G.

By way of example, if the system resource monitor 150 determines that server D in virtual cluster B, 140, is in trouble (e.g., slow response time, or heavy CPU or memory utilization), an advisory message is sent to the intelligent network dispatcher 130 advising that server D is overloaded and a candidate for load reduction. In response, the intelligent network dispatcher 130 may reduce the rate of routing towards server D, generally indicated by reference numeral 144. The rate of reduction may be related to a parameter from the advisor function within the system resource monitor 155 indicative of the relative degree of overload. Further, the system resource monitor may subsequently send another advisory when server D has crossed into an acceptable performance threshold condition, indicating that an incremental increase in routing to server D may occur (or alternatively, maintained steady).

The system resource monitor 150 may also maintain configuration information on each server A-G, such as, for example, processor speed, bus speed, or I/O capacity that may be translated into overall processing capacity. Using this information, the system resource monitor 150 may be able to forecast and project, before bottlenecks occur, the ramp up rate (or, conversely, ramp down rate) and avert overloads before they actually occur by providing early advisories to the intelligent network dispatcher 130. Composite statistics may also be maintained to indicate overall virtual cluster performance in order to ascertain when a virtual cluster requires more capacity, or alternatively, may be a candidate for releasing capacity (e.g., by releasing a server form the virtual cluster).

Figure 4A:
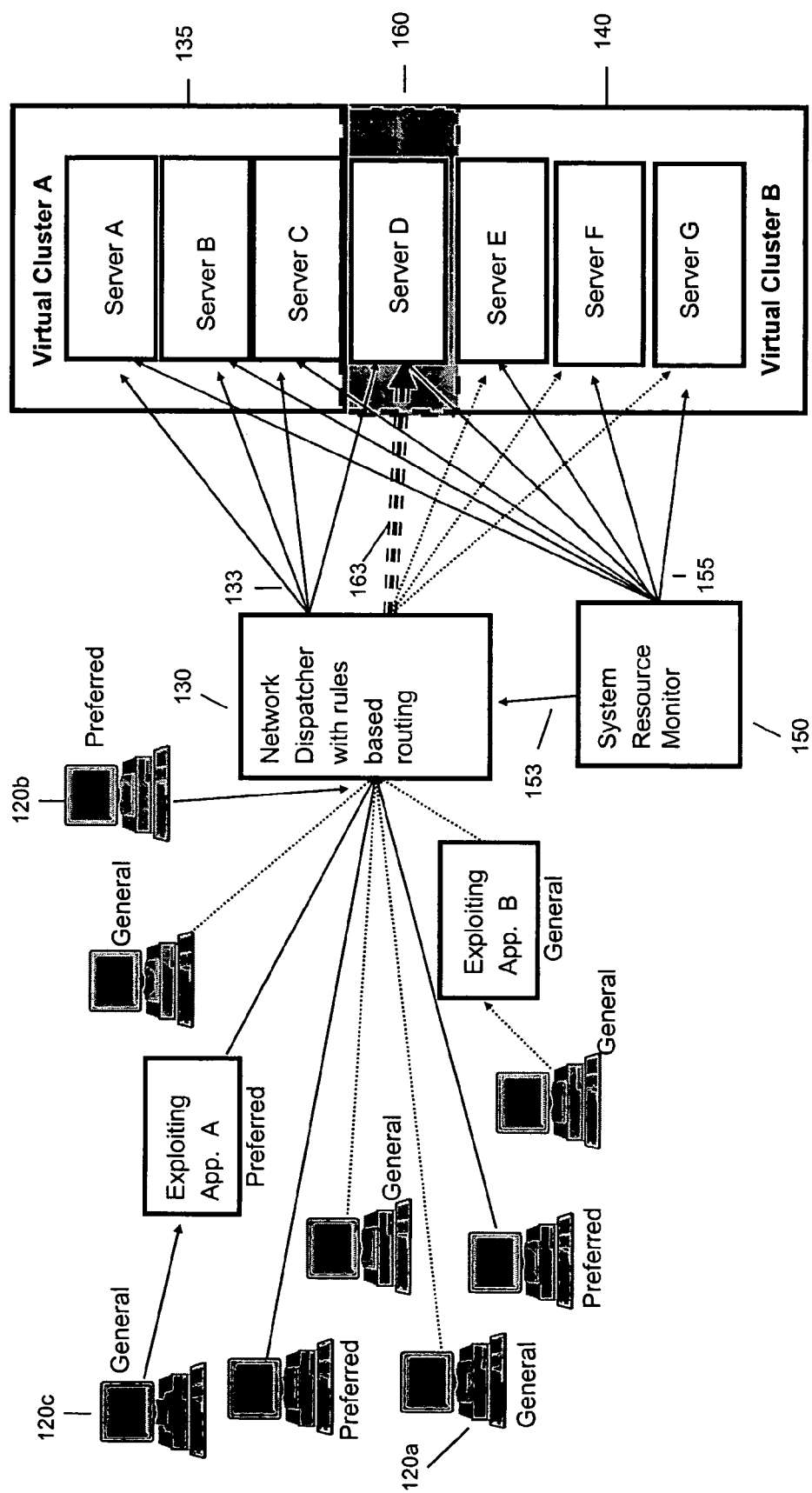
FIGS. 4A-4C are block diagrams of embodiments of the invention.
Figure 4B:
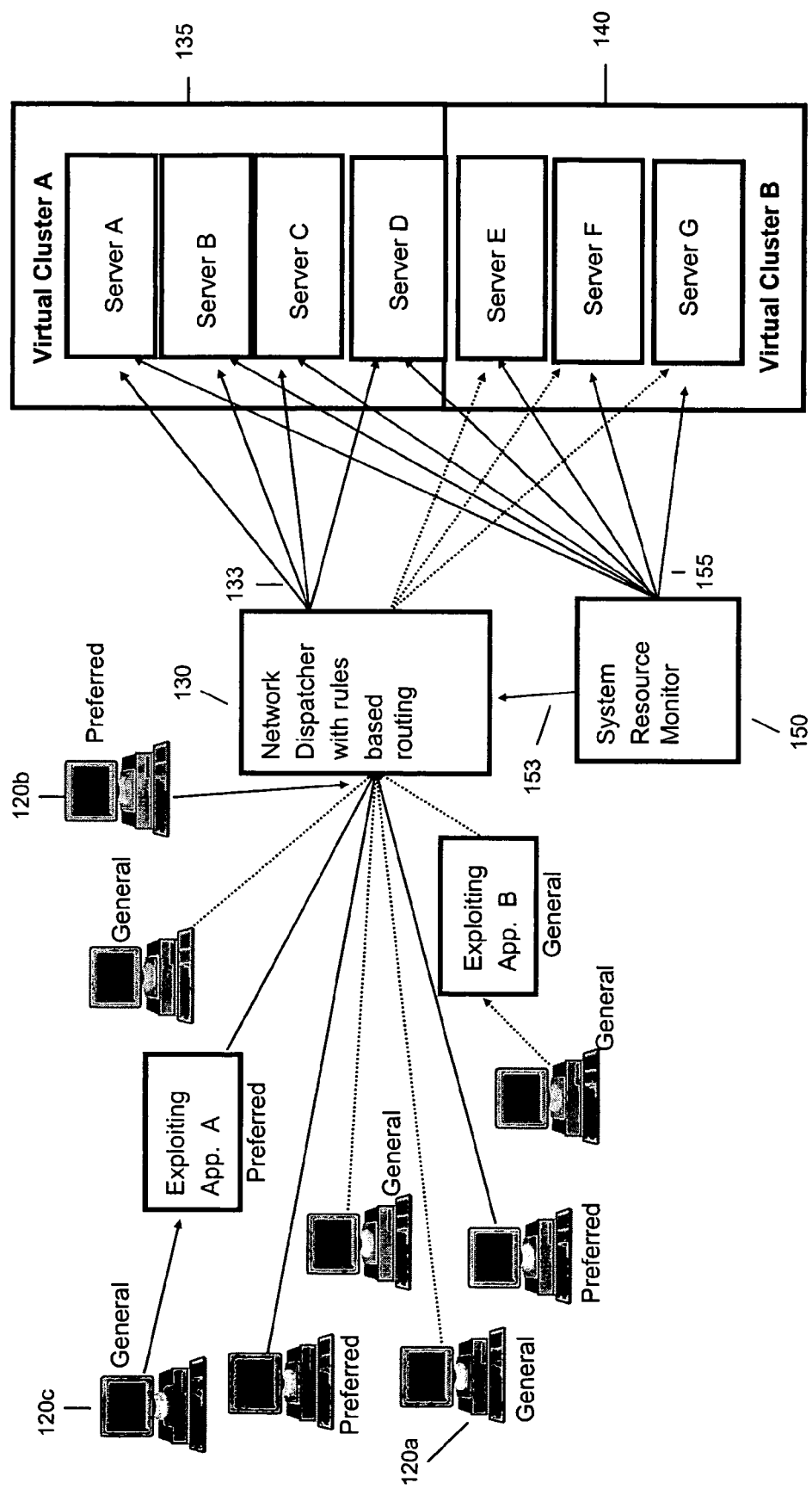
Figure 4C:
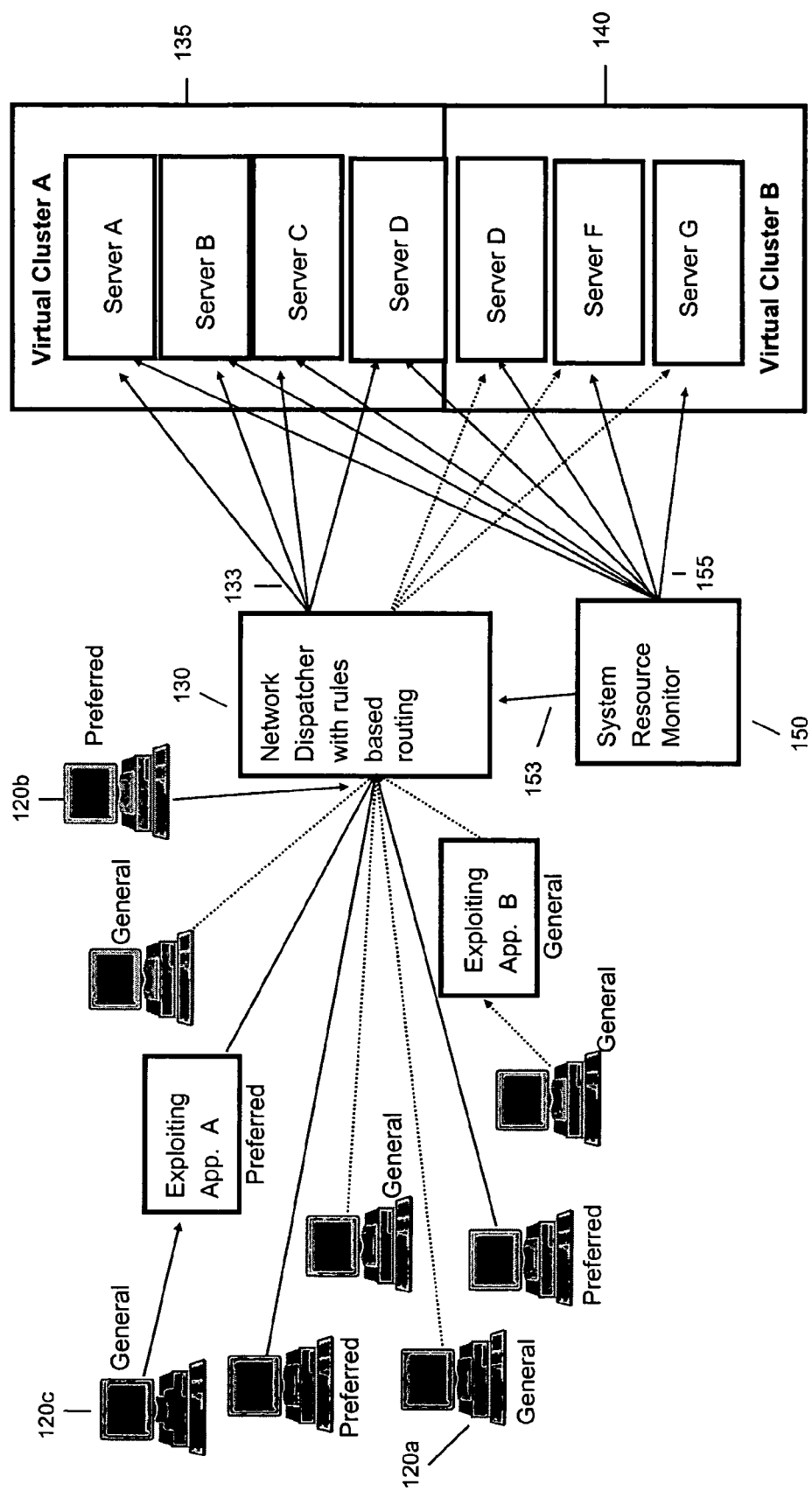

FIGS. 4A-4C are block diagrams of embodiments of the invention. In FIG. 4A, the system resource monitor 150 detects that server D may be burdened and causes the intelligent network dispatcher 130 to remove server D from the virtual cluster B, 140, effectively creating a new virtual cluster 160 having only server D as a member. Server D remains alone until such time as the system resource monitor 150 determines that server D may be ready for more load. At such time, server D may be returned to cluster B, 140. This configuration adjustment typically is provided to the network dispatcher 130 as an advisory so that routing changes may be instituted accordingly by the intelligent network dispatcher 130. It should be understood, though, that this reallocation may be created for any server or number of servers depending on variables such as, for example, demand and load for such server(s).

As another activity, the system resource monitor 150 may be configured to determine when all servers within a virtual cluster (e.g., 135) may be essentially equally loaded over a predetermined workload threshold and more capacity may be required by the virtual cluster (e.g., 135). The system resource monitor 150 may then check other existing clusters (e.g., 140) for status on member servers for reassignment of one of the servers. For example, if one or more member servers are below a predetermined threshold (i.e., has available capacity), and, optionally, if removal of the one or more servers does not place the overall capacity of the virtual cluster in jeopardy (below a predetermined cluster capacity rating), a re-assignment may be triggered.

Referring to FIG. 4B, re-assignment of a server (e.g., server D) from one cluster to another may involve re-assigning the selected server from one cluster to another (e.g., from virtual cluster B, 140 to virtual cluster A, 135) so that the reassigned server receives only requests for cluster A, 135. Alternatively, as shown in FIG. 4C, the selected server (e.g., server D) may remain in virtual cluster B, 140, and also start to receive requests for virtual cluster A, 135, in addition to B, 140. Stated differently, the "re-assigned" server may be performing double-duty in two virtual clusters by being assigned to two different virtual clusters. This may be sufficient to alleviate a short-term bubble of requests. Depending on desired results under heavy load, all servers may be held in their own cluster or one or more servers may be assigned to service more than one virtual cluster. That is, a server may become a member in one or more virtual clusters as needed.

Another embodiment provides for defining a super virtual cluster, whereby a super virtual cluster may be defined by including one or more virtual clusters in the definition. In this way, a simple mechanism exists to move whole virtual clusters (that may have multiple servers) into and out operation (or simply tailoring capacity) based on class of service, grade of serve, time of day/week, or peak demands, and the like. This may also apply where there may be different applications being hosted by different virtual cluster addresses.

The intelligent network dispatcher 130 may also have the ability to add a weighting factor (e.g., from 10 to 0) for the servers it distributes load toward. A server with a higher weighting factor may have more requests directed to that server. The advisor may have a unique monitoring code that determines the server (e.g., LDAP server) response time, connection counts, CPU utilization, etc. If response degrades, then the advisor dynamically lowers the factor number. Conversely, if the response improves, the advisor may dynamically raise the factor as response improves to the maximum weighting factor limit. This helps to load balance and more efficiently utilize server resources, and may save on the number of servers needed for hosting certain applications and/or multiple applications.

By way of example, a circumstance may exist where the system resource monitor 150 checks each server (e.g., server A-G) periodically and discovers that a response time in a particular server is greater than a predetermined threshold and the connection count is increasing (reflective of slowing of processing within the server), but the response time is less than another higher predetermined threshold. This being the first noted slower response time, the system resource monitor 150 may decrease this particular server's weighting factor by a predetermined amount in the network dispatcher 130, and thus causing a lowering of the traffic routed towards that server. After the second noted slower response time and connection count is noted, the factor may be lowered again which may be the maximum low limit allowable. This low limit may be maintained at this low limit factor until the monitored server shows decrease connection counts for a predetermined period. Otherwise, if the monitored server continues to show poor response and the connection count (e.g., number of current requests pending) appears to be flat or growing for additional cycles, or for a predetermined time period, for example, then the system monitor may assume that this server is still under extreme load conditions. The system resource monitor 150 may then remove the server out of the assigned cluster to stop additional load from flowing to this server and to permit the server to catch up with the queued requests on its own.

Similarly, the same may be true if the response time is greater than, for example, approximately one minute and the connection count is flat or growing. The server may most likely be under extreme load or may be hung (i.e., non-responsive). The system resource monitor 150 may then remove this server out of the cluster (i.e., reduces/removes load) to see if it recovers. In either of the previous two cases, when the server is removed from the virtual cluster to recover, the weighting factor typically remains at a maximum low count until the response time improves and the connection count decreases. At which time, the normal monitoring activities may resume and as response time improves, the weighting factor is raised. Anytime a server is recycled or comes on line (e.g., after the weekly recycle or maintenance activity), the weighting factor is set to a maximum weighting factor such as, for example, 10.

Using the Invention

Figure 5A:
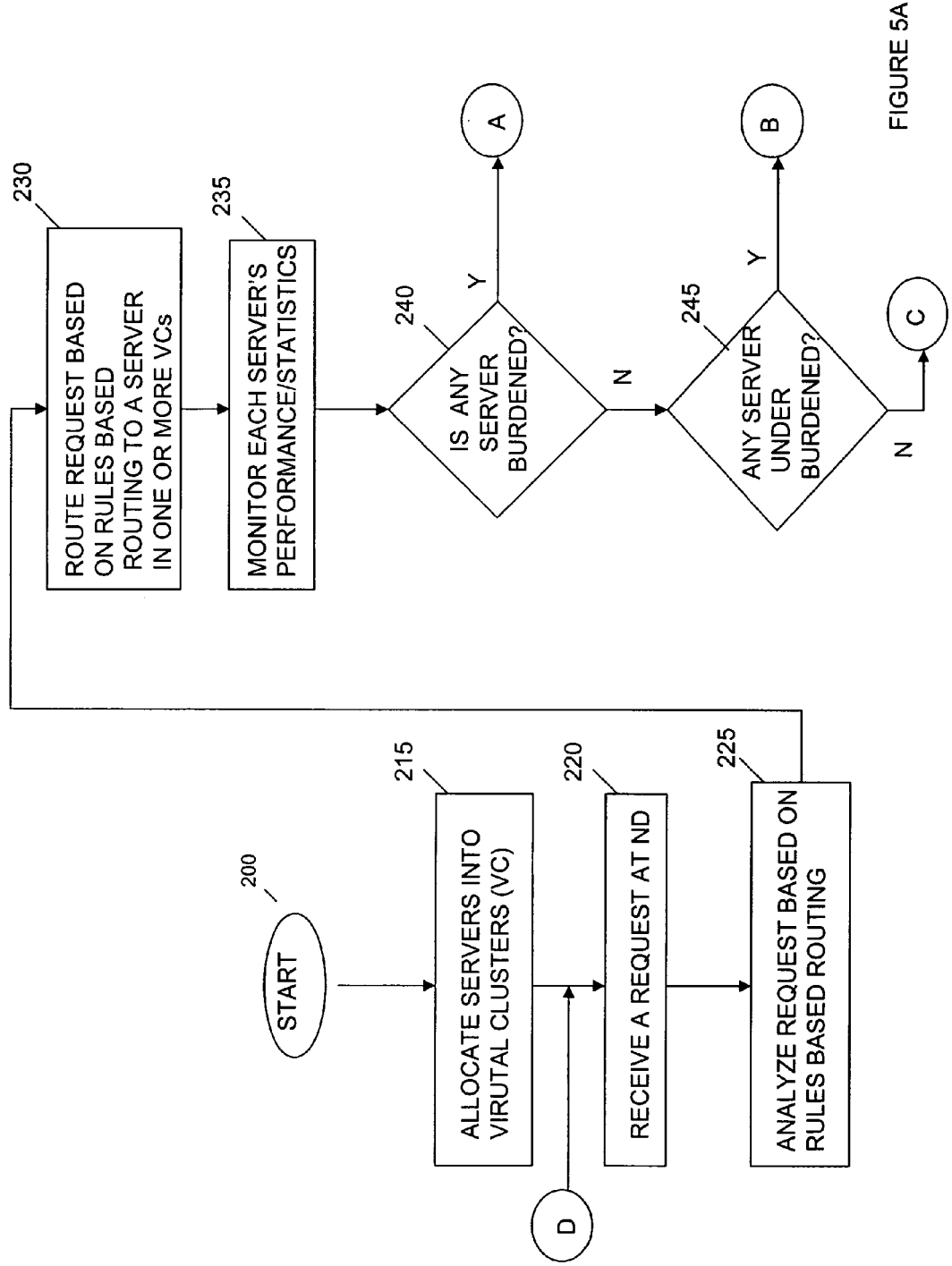
FIGS. 5A and 5B are flow diagrams of an embodiment showing steps of using the invention.
Figure 5B:
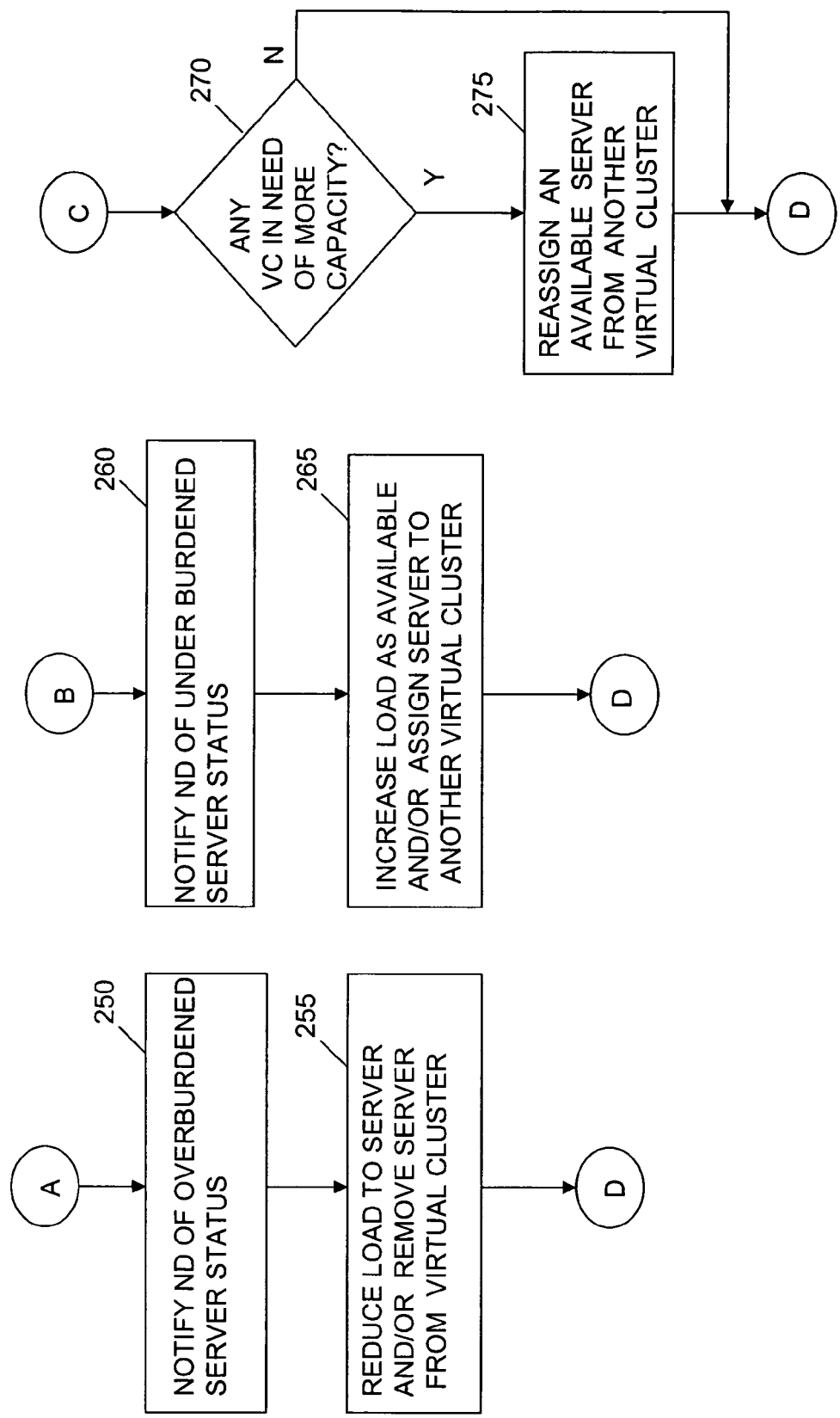

FIGS. 5A and 5B are flow diagrams of an embodiment showing steps of using the invention beginning at 200. FIGS. 5A and 5B may equally represent a high-level block diagram of components of the invention implementing the steps thereof. The steps of FIGS. 5A and 5B may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. FIGS. 5A and 5B may also be implemented, for example, using the components of FIGS. 2-4.

Continuing with the flow of FIG. 5A, at step 215, servers associated with an intelligent network dispatcher with rules based routing may be allocated into one or more virtual clusters. The allocation may be based, for example, upon types of applications that the servers are to service, or may be allocated by class of customers that the cluster may service (e.g., preferred, general, or other class) in order to provided graded classes of service. A server may also be allocated to one or more virtual clusters. At step 220, a request is received by the intelligent network dispatcher for routing to an appropriate server (e.g., a LDAP server or a web applications server). At step 225, the request is analyzed based upon rules based routing criteria. The rules based routing criteria may include analysis on the requester's identity (e.g., class of customer, IP address, other network address, or user ID, etc.), requested server application, time-of-day or day of week, and the like as discussed throughout.

At step 230, the intelligent network dispatcher may route the request to a server based on the rules. The server may be selected from among one or more servers in a virtual cluster that may be defined in the routing rules. At step 235, each server's performance and/or statistics may be monitored by the system resource monitor in order to discover changes in capabilities to process requests.

At step 240, a check may be made to ascertain whether any of the servers may be over burdened or no longer meet desired performance criteria. If the server performance, e.g., determined based on statistics, has crossed a threshold of performance then, at step 250, the intelligent network dispatcher may be notified of the new status of the burdened server by the advisory component of the system resource monitor. At step 255, the intelligent network dispatcher reacts to the notification by either reducing load to the burdened server and/or may remove the server as a member of the virtual cluster. If the server is removed as a member of a virtual cluster, the load typically declines.

Although the server may be removed from a virtual cluster, in embodiments, it may remain a member of one or more other virtual clusters for which it continues to receive requests for processing. The network dispatcher may also manage weighting assignments associated with the burdened cluster to aid in reducing traffic to the server. The process continues at step 220, where a new request may be received by the intelligent network dispatcher.

If at step 240, no server is deemed burdened, then at step 245, a check may be made to determine whether any server may be under burdened based on statistics. This check may also be made when any virtual cluster may be in need of more capacity. If a server may be deemed under burdened, then at step 260, the advisory component may notify the network dispatcher that a particular server may be under-utilized. At step 265, the network dispatcher increases request routing to the under-utilized server, when the amount of requests permit an increase. The server may also be assigned to another virtual cluster. The process continues at step 220.

If at step 245, no server is deemed under-utilized, then at step 270, a check may be made whether any virtual cluster may be in need of more capacity (e.g., a virtual cluster, as a whole, may be over burdened). If not, then the process continues at step 220. Otherwise, when a virtual cluster may be deemed over burdened and in need of more capacity, at step 275, an available (e.g., under utilized) server from another virtual cluster may be re-assigned to add capacity and improve overall virtual cluster capacity and throughput. This re-assignment may also occur at predetermined scheduled time periods (e.g., anticipated peak periods or in compliance with a pre-agreed customer agreement). The process continues at step 220. The steps of FIGS. 5A and 5B may continue until a system reset or power cycle occurs when the process begins again at step 200.

While the invention has been described in terms of embodiments, those skilled in the art will recognize that the invention can be practiced with modifications and in the spirit and scope of the appended claims.

What is claimed is:

1. A method of processing queries in a network, comprising the steps of:
    defining a plurality of virtual clusters from a plurality of servers;
    routing a request to a virtual cluster of the plurality of virtual clusters based on predetermined criteria in order to allocate system resources;
    removing at least one of the plurality of servers from the virtual cluster when at least one of the plurality of servers is burdened;
    creating a new virtual cluster comprising only the removed at least one of the plurality of servers;
    returning the removed at least one of the plurality of servers back to the virtual cluster when the at least one of the plurality of servers is unburdened;
    monitoring performance of the plurality of servers; and
    sending a report in response to workload at one of the plurality of servers exceeding a pre-determined threshold so that routing of further requests to the one of the plurality of servers is altered; and
    removing the one of the plurality of servers from an associated virtual cluster and adding the one of the plurality of servers back into the associated virtual cluster in response to workload falling below the predetermined threshold.

2. The method of claim 1, wherein the sending a report sends a report to a network dispatcher and the network dispatcher performs the routing.

3. The method of claim 1, further comprising the steps of:
    determining that one of the plurality of servers is overburdened based on statistics; and
    reducing workload to the one of the plurality of servers if the statistics are above a threshold.

4. The method of claim 3, wherein the reducing step includes at least one of removing the one of a plurality of servers from one of the plurality of virtual clusters and limiting further requests from being routed to the one of a plurality of servers.

5. The method of claim 4, wherein the reducing step includes reassigning the one of a plurality of servers to another one of the plurality of virtual clusters.

6. The method of claim 1, wherein at least one of the plurality of servers is assigned to more than one of the plurality of virtual clusters.

7. The method of claim 1, wherein the predetermined criteria includes at least one of requester identity, requested application, time of day, day of week, and performance statistics.

8. The method of claim 7, wherein the requester identity is an internet address.

9. The method of claim 7, wherein the performance statistics include at least one of central processing unit (CPU) performance statistics, memory statistics, connection counts, throughput statistics, and response time statistics.

10. The method of claim 1, wherein the routing step includes selecting one of the plurality of virtual clusters for routing based on at least one of a requester's identity and a requested application.

11. The method of claim 10, further including selecting one server from the one of the plurality of virtual clusters for routing based on statistics.

12. The method of claim 11, wherein the selecting is based on performance statistics.

13. The method of claim 1, wherein at least one of the plurality of servers is at least one of a lightweight directory access protocol (LDAP) server and a web application server.

14. The method of claim 1, wherein the routing uses rules based routing.

15. The method of claim 1, further comprising the steps of reassigning one of the plurality of servers from one of the plurality of virtual clusters to another one of the plurality of virtual clusters, wherein the one of the plurality of virtual clusters has a workload below a threshold and the another one of the plurality of virtual clusters has a workload above the predetermined threshold.

16. A method for load balancing servers, comprising the steps of:
    allocating a plurality of servers among a plurality of virtual clusters;
    monitoring the plurality of virtual clusters for workload capacity;
    removing at least one of the plurality of servers from the plurality of virtual clusters when at least one of the plurality of servers is burdened;

creating a new virtual cluster comprising only the removed at least one of the plurality of servers;
returning the removed at least one of the plurality of servers back to the plurality of virtual clusters when the at least one of the plurality of servers is unburdened; and
reassigning at least one server from one of the plurality of virtual clusters to another of the plurality of virtual clusters based on workload capacity of the at least one server in order to reallocate system resources,
wherein the monitoring step includes determining when a workload capacity of the one of the plurality of virtual clusters has crossed a threshold based on statistics associated with one of a plurality of virtual cluster's performance; and
further comprising the step of identifying another of the plurality of virtual cluster having available workload capacity based on statistics associated with the virtual cluster's performance and transferring at least one of the plurality of servers to the another of the virtual cluster.

17. The method of claim 16, wherein the reassigning at least one server includes one of:
removing the server entirely from the one of a plurality of virtual cluster, and
assigning the at least one server to both the one of a plurality of virtual clusters and the another of the plurality of virtual clusters.

18. The method of claim 16, further comprising routing a request to one of the plurality of virtual clusters based on one of the requestor's identity, the requested application, and rules.

19. The method of claim 18, further comprising selecting one server assigned to the one of the plurality of virtual clusters based on statistics for routing the request.

20. A computer program product comprising a computer usable storage medium having readable program code embodied in the storage medium, the computer program product includes at least one component to:
define a plurality of virtual clusters from a plurality of servers;
route a request to a virtual cluster of the plurality of virtual clusters based on predetermined criteria to allocate system resources;
remove at least one of the plurality of servers from the virtual cluster when at least one of the plurality of servers is burdened;
create a new virtual cluster comprising only the removed at least one of the plurality of servers;
return the removed at least one of the plurality of servers back to the virtual cluster when the at least one of the plurality of servers is unburdened;
monitor performance of the plurality of servers;
send a report in response to workload at one of the plurality of servers exceeding a pre-determined threshold so that routing of further requests to the one of the plurality of servers is altered; and
remove the one of the pluarlity of servers from an associated virtual cluster and add the one of the plurality of servers back into the associated virtual cluster in response to workload falling below the predetermined threshold.

21. The system of claim 20, wherein the at least one component sends a report to a network dispatcher and the network dispatcher performs the routing.

22. The system of claim 20, wherein the at least one component:
determines that one of the plurality of servers is overburdened based on statistics; and
reduces workload to the one of a plurality of servers if the statistics are above a threshold.

23. The system of claim 22, wherein the at least one component removes the one of a plurality of servers from one of the plurality of virtual clusters and limits further requests from being routed to the one of a plurality of servers.

24. The system of claim 23, wherein the at least one component reassigns the one of a plurality of servers to another one of the plurality of virtual clusters to reallocate the system resources.

25. The system of claim 20, wherein the at least one component assigns at least one of the plurality of servers to more than one of the plurality of virtual clusters.

26. The system of claim 20, wherein the predetermined criteria includes at least one of requester identity, requested application, time of day, day of week, performance statistics.

27. The system of claim 26, wherein the requester identity is a network address.

28. The system of claim 26, wherein the performance statistics include at least one of central processing unit (CPU) performance statistics, memory statistics, connection counts, throughput statistics, and response time statistics.

29. The system of claim 20, wherein the at least one component selects one of the plurality of virtual clusters for routing based on at least one of a requester's identity, composite statistics, and a requested application.

30. The system of claim 20, wherein the at least one component selects a non over-burdened server from the one of the plurality of virtual clusters to process information.

31. The system of claim 30, wherein the at least one component selects based on performance statistics.

32. The system of claim 20, wherein at least one of the plurality of servers is one of a lightweight directory access protocol (LDAP) server and a web application server.

33. The system of claim 20, wherein the at least one component uses rules based routing.

34. The system of claim 20, wherein the at least one component reassigns one of the plurality of servers from one of the plurality of virtual clusters to another one of the plurality of virtual clusters, wherein the another of the plurality of virtual clusters has a workload below a threshold and the one of the plurality of virtual clusters has a workload above the predetermined threshold.

35. The method of claim 1, further comprising projecting a rate of routing to each of the plurality of servers.

36. The method of claim 35, further comprising adjusting the rate of routing based on a relative degree of overload on at least one of the plurality of servers.

37. The method of claim 36, further comprising providing early advisories when the rate of routing is projected to overload at least one of the plurality of servers.

38. The method of claim 1, further comprising determining when the plurality of servers in the virtual cluster are equivalently loaded over a predetermined workload threshold and more capacity is needed.

39. The method of claim 1, further comprising re-assigning at least one of the plurality of servers when the virtual cluster is above a predetermined cluster capacity rating.

* * * * *